United States Patent [19] [11] 3,904,641
Nakanishi et al. [45] Sept. 9, 1975

[54] TRIAZOLOTHIENODIAZEPINE COMPOUNDS

[75] Inventors: Michio Nakanishi, Oita; Tetsuya Tahara, Fukuoka; Kazuhiko Araki, Fukuoka; Masami Shiroki, Fukuoka, all of Japan

[73] Assignee: Yoshitomi Pharmaceutical Industries, Ltd., Osaka, Japan

[22] Filed: June 12, 1972

[21] Appl. No.: 261,757

[30] Foreign Application Priority Data

June 18, 1971  Japan.............................. 46-44288
June 21, 1971  Japan.............................. 46-45011
June 30, 1971  Japan.............................. 46-48336
July 8, 1971   Japan.............................. 46-50911
July 10, 1971  Japan.............................. 46-51211
July 13, 1971  Japan.............................. 46-52242

[52] U.S. Cl................ 260/308 R; 260/239.3 B; 260/294.8 A; 260/294.8 B; 260/294.8 C; 260/329 F; 260/332.2 R; 260/332.3 R; 424/263; 424/269
[51] Int. Cl.² .............. C07D 495/04; C07D 495/14
[58] Field of Search ... 260/308 R, 294.8 A, 294.8 B

[56] References Cited
UNITED STATES PATENTS 3,402,171  9/1968  Reeder et al. ............... 260/239.3 D
3,709,898  1/1973  Hester........................... 260/308 R
3,734,922  5/1973  Hester........................... 260/308 R

FOREIGN PATENTS OR APPLICATIONS 6,916,543  5/1970  Netherlands.................... 260/308 R
1,961,727  9/1970  Germany....................... 260/239.3 B

OTHER PUBLICATIONS

Gray et al., Arch. Int., "Pharmacodyn," Vol. CXXV, pp. 101-120, (1960).
Geller, Arch. Int., "Pharmacodyn.," Vol. 149, pp. 243-247, (1964).
Gilman et al., "The Pharmacological Basis of Therapeutics," Fourth Edition, (The MacMillan Company), pp. 21-22.
Zbindeu et al., "Advances in Pharmacology," Vol. 5, pp. 213, 216-217, 256-257, (Academic Press, 1967).

Burger, "Drugs Affecting the Central Nervous System," Vol. 2, (New York, 1968), pp. 237-241.
Childress et al., "J. Pharm. Sci.," Vol. 53, pp. 577-590, (1964).
Sternbach et al., Symposium on CNS Drugs (Hyderabad, Mdia, CSIR, 1966), pp. 53-69, (pp. 14-17 of reprint furnished).
Turner, Screening Methods in Pharmacology (Academic Press, 1965), pp. 87-92, RS189T8.
Hester et al. J. Med. Chem., Vol. 14, pp. 1078-1081 (1971), RS1J6.
Wang et al., J. Int. Med. Res., Vol. 1, pp. 600-607 (1973), copy with paper No. 5.

*Primary Examiner*—Alton D. Rollins
*Attorney, Agent, or Firm*—Sughrue, Rothwell, Mion, Zinn and Macpeak

[57] ABSTRACT

Triazolothienodiazepine compounds of the formula:

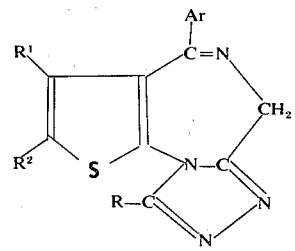

wherein Ar is a member selected from the group consisting of a phenyl group optionally substituted and a pyridyl group; each of $R^1$ and $R^2$ is a member selected from the group consisting of a hydrogen atom and an alkyl group having 1 to 4 carbon atoms, or $R^1$ and $R^2$ together form a tetramethylene group, i.e. $-(CH_2)_4-$; and R is a member selected from the group consisting of a hydrogen atom, an alkyl group having 1 to 4 carbon atoms and a phenyl group optionally substituted; and pharmaceutically acceptable acid addtion salts thereof are disclosed. They are useful as minor tranquillizers.

8 Claims, No Drawings

TRIAZOLOTHIENODIAZEPINE COMPOUNDS

This invention relates to novel and therapeutically valuable 4H-s-triazolo[3,4-c]thieno[2,3-e][1,4]diazepine compounds of the formula:

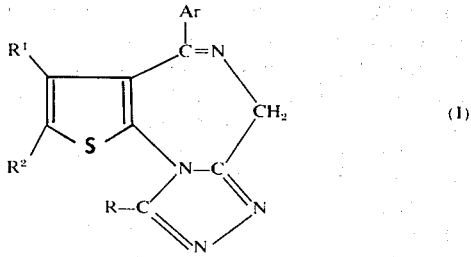

(I)

and pharmaceutically acceptable acid addition salts thereof, wherein Ar is a member selected from the group consisting of a phenyl group optionally substituted (e.g. phenyl, chlorophenyl, bromophenyl, fluorophenyl, tolyl, methoxyphenyl or trifluoromethylphenyl) and a pyridyl group; each of $R^1$ and $R^2$ is a member selected from the group consisting of a hydrogen atom and an alkyl group having 1 to 4 carbon atoms (e.g. methyl, ethyl, propyl or butyl), or $R^1$ and $R^2$ together form a tetramethylene group; and R is a member selected from the group consisting of a hydrogen atom, an alkyl group having 1 to 4 carbon atoms and a phenyl group optionally substituted.

The compounds of formula (I) can be produced by reacting a compound of the formula:

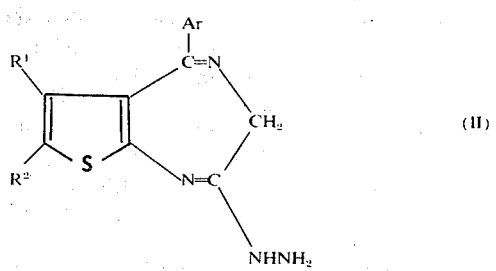

(II)

wherein Ar, $R^1$ and $R^2$ are as defined above, with an acid of the formula:

R—COOH (III)

wherein R is as defined above, or a functional derivative thereof.

The functional derivative of an acid of frmula (III) is, for example, an orthoacid ester [R—C(—O—R')$_3$], an imino ether [R—C(=NH)—O—R'], an amidine [R—C(=NH)—NH$_2$], an amide [R—CONH$_2$], a thioamide [R—CSNH$_2$], an ester [e.g. methyl, ethyl or p-nitrophenyl ester], an acid anhydride [(R—CO)$_2$O], an acid halide [e.g. R—COCl] or a nitrile [R—CN]. The symbol R is as defined above and R' is an alkyl group having 1 to 4 carbon atoms. The said imino ether and amidine are usually used in the form of a mineral salt such as the hydrochloride. Hereinafter, an acid of formula (III) or its function derivative is called generically as an acid derivative (III).

The reaction conditions may be selected in accordance with a kind of starting acid derivative (III). In general, the reaction is carried out with or without a solvent such as methanol, ethanol, chloroform, tetrahydrofuran, benzene, toluene or a mixture thereof, in the presence or absence of a catalyst such as an acid catalyst (e.g. hydrochloric, sulfuric, phosphoric, polyphosphoric, acetic, propionic, benzenesulfonic or p-toluenesulfonic acid) or a base (e.g. 2-methylimidazole, pyridine or triethylamine), at a temperature of from about 0°C to about 300°C.

More particularly, the compounds of formula (I) can be produced by one of the following methods:

METHOD I.

In case the starting acid derivative (III) is an orthoacid ester: the reaction is usually carried out in an excess orthoacid ester, which serve as a solvent, at a temperature of from room temperature to about 100°C, or in a solvent such as mentioned above in the presence of an acid catalyst such as mentioned above, at a temperature of from room temperature to a refluxing temperature.

METHOD II.

In case the starting acid derivative (III) is an imino ether:
the reaction is usually carried out in a solvent such as mentioned above, at a temperature of from room temperature to a refluxing temperature.

METHOD III.

In case the starting acid derivative (III) is an amidine: the reaction is usually carried out in the presence of a base catalyst (e.g. 2-methylimidazole) at an elevated temperature, for example, at a temperature between 150°C to 250°C. In this case, when the amidine and a compound of formula (II) are treated under mild conditions, for example, in a solvent such as mentioned above in the presence of a base catalyst such as mentioned above, at room temperature, the intermediate of the following formula (IV) is firstly formed:

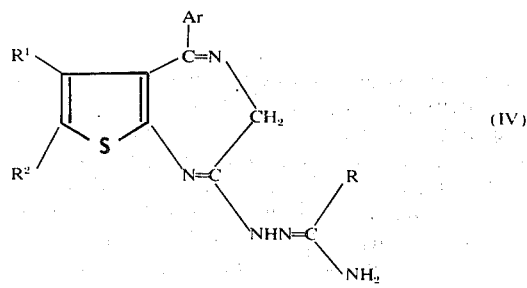

(IV)

wherein Ar, $R^1$, $R^2$ and R are as defined above. The intermediate of formula (IV) can be isolated and subjected to the next reaction, i.e. the ring closure under heating at a temperature between 150°C to 250°C. The isolation is however, not always necessary.

METHOD IV.

In case the starting acid derivative (III) is an amide or thioamide: the reaction is usually carried out with or without a solvent such as mentioned above in the presence of an acid catalyst such as mentioned above, at a temperature of from room temperature up to about 300°C.

METHOD V.

In case the starting acid derivative (III) is an acid itself, an ester, an acid anhydride, an acid halide or a nitrile: the intermediate of following formula (V) is firstly formed when the acid derivative (III) and a compound of formula (II) are treated under mild conditions, for example, in a solvent such as mentioned above, at room temperature.

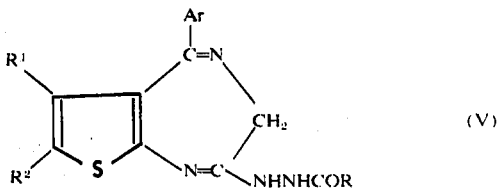

wherein Ar, R¹, R² and R are as defined above. The intermediate of formula (V) can be isolated and subjected to the next reaction, i.e. the ring closure under heating at a temperature between 100°C to 250°C without a solvent, or in a solvent such as mentioned above in the presence of an acid catalyst such as mentioned above. The isolation is, however, not always necessary. The intermediate of formula (V) can also be prepared by reacting a compound of the formula:

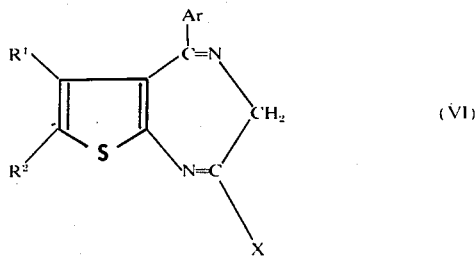

wherein X is —SH, —S—CH₃ or —NH₂, and Ar, R¹ and R² are as defined above, with a compound of the formula:

wherein R is as defined above, in a solvent such as mentioned above, if desired in the presence of an acid catalyst such as mentioned above, at a temperature of from room temperature to a refluxing temperature.

The starting compounds of formula (II) can be prepared by reacting a compound of the above formula (VI) with hydrazine, usually in a solvent such as mentioned above, if desired in the presence of an acid catalyst such as mentioned above, at a temperature of from room temperature to a refluxing temperature. Specific examples are given as follows:

2-HYDRAZINE-5-O-CHLOROPHENYL-7-ETHYL-3H-THIENO[2,3-E][1,4]DIAZEPINE

1. Hydrazine hydrate (8 ml) is added to a suspension of 32.1 g of 5-o-chlorophenyl-7-ethyl-1,2-dihydro-3H-thieno[2,3-e][1,4]diazepine-2-thione in 200 ml of methanol. Several minutes stirring turns the suspension into a homogeneous, red, transparent solution. Then crystals begin to precipitate. After stirring at room temperature for 2 hours and subsequent ice-cooling, the crystals are collected by suction filtration and washed well with methanol to give 28.6 g of almost pure title compound as yellow crystals. The crystals, when recrystallized from a mixture of ethanol and dimethylformamide, show a melting point of 214°–216°C (decomposition).

2. Hydrazine hydrate (1 ml) is added to a solution of 3.4 g of 2-methylthio-5-o-chlorophenyl-7-ethyl-3H-thieno[2,3-e][1,4]diazepine in 70 ml of methanol, and the resulting solution is stirred at room temperature for 2 hours. The precipitated crystals are collected by filtration, washed well with methanol and then recrystallized from a mixture of ethanol and tetrahydrofuran to give 2.4 g of the total compound as yellow crystals, melting at 214°–216°C with decomposition.

3. Hydrazine hydrate (1.5 ml) is added to a solution of 3.1 g of 2-amino-5-o-chlorophenyl-7-ethyl-3H-thieno[2,3-e][1,4]diazepine and 0.6 ml of glacial acetic acid in 50 ml of methanol, and the resulting solution is stirred at room temperature for 2 hours. The precipitated crystals are collected by filtration and recrystallized from a mixture of ethanol and dimethylformamide to give 2.3 g of the title compound as yellow crystals, melting at 214°–216°C with decomposition.

The following compounds are prepared in an analogous manner:

2-Hydrazino-5-phenyl-7-ethyl-3H-thieno[2,3-e][1,4]diazepine, melting at 197°–198°C with decomposition;

2-Hydrazino-5-o-fluorophenyl-7-ethyl-3H-thieno[2,3-e][1,4]diazepine, melting at 203°–204°C with decomposition;

2-Hydrazino-5-o-tolyl-7-ethyl-3H-thieno[2,3-e][1,4]diazepine, melting at 205°–207°C with decomposition;

2-Hydrazino-5-o-methoxyphenyl-7-ethyl-3H-thieno[2,3-e][1,4]diazepine, melting at 207°–208°C with decomposition;

2-Hydrazino-5-o-chlorophenyl-7-methyl-3H-thieno[2,3-e][1,4]diazepine, melting at 216°–218°C with decomposition;

2-Hydrazino-5-phenyl-6,7-dimethyl-3H-thieno[2,3-e][1,4]diazepine, melting at 225°–227°C with decomposition;

2-Hydrazino-5-o-chlorophenyl-6,7-dimethyl-3H-thieno[2,3-e][1,4]diazepine, melting at 222°–224°C;

2-Hydrazino-5-o-chlorophenyl-6,7,8,9-tetrahydro-3H-[1]benzothieno[2,3-e][1,4]diazepine, melting at 212°–213°C with decomposition;

2-Hydrazino-5-phenyl-6,7,8,9-tetrahydro-3H-[1]benzothieno[2,3-e][1,4]diazepine, melting at 212°–213°C;

2-Hydrazino-5-(2-pyridyl)-7-ethyl-3H-thieno[2,3-e][1,4]diazepine, melting at 164°–165°C;

2-Hydrazino-5-(3-pyridyl)-7-ethyl-3H-thieno[2,3-e][1,4]diazepine, melting at 182°–183°C with decomposition; and 2-Hydrazino-5-o-bromophenyl-7-ethyl-3H-thieno[2,3-e][1,4]diazepine, melting at 189°–190°C.

The isolation of the thus obtained compounds of formula (II) prior to the reaction with an acid derivative (III) is not necessary. Thus, the compounds of formula (I) can also be produced by reacting a compound of formula (VI) with hydrazine, and then the resulting compound of formula (II), without isolation, with an acid derivative (III).

The compounds of formula (VI) can be prepared by one of the following methods (a) to (c).

METHOD A.

This method can be used to prepare compounds of formula (VI) wherein X is —NH$_2$. In this method, a compound of the formula:

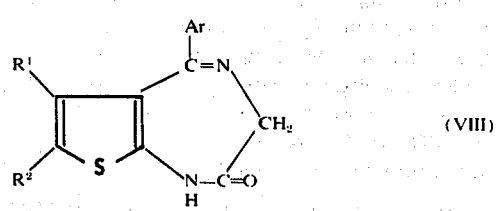

(VIII)

wherein Ar, R$^1$ and R$^2$ are as defined above, is allowed to react with ammonia, in a solvent such as tetrahydrofuran in the presence of a Lewis acid such as TiCl as dehydrating catalyst. Thus is obtained, for example, 2-amino-5-o-chlorophenyl-7-ethyl-3H-thieno[2,3-e][1,4]diazepine showing a melting point of 247°–248°C.

Tautomerism is encountered in the compounds of formula (VI) wherein X is —NH$_2$:

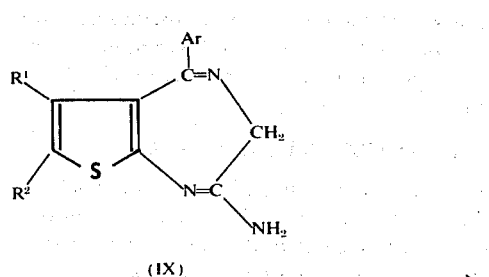

(IX)

⇌

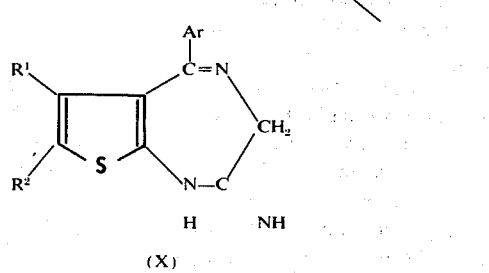

(X)

wherein Ar, R$^1$ and R$^2$ are as defined above. In this specification, however, these compounds are named as 2-amino compounds of formula (IX).

The compounds of formula (VIII) can be prepared, for example, by the methods disclosed in Published West Germany Patent Applications OLS-2107356 and OLS-2144105, namely by subjecting a compound of the formula:

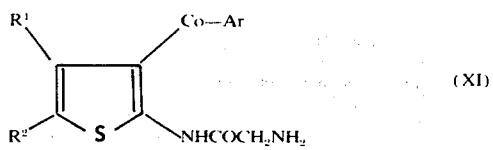

(XI)

wherein Ar, R$^1$ and R$^2$ are as defined above, to intramolecular condensation.

METHOD B.

This method can be used to prepare compounds of formula (VI) wherein X is —SH. In this method, a compound of formula (VIII) is allowed to react with diphosphorus pentasulfide (P$_2$S$_5$), in a solvent such as pyridine, dimethylformamide, tetrahydrofuran or a mixture thereof, at a temperature of from room temperature to a refluxing temperature. A specific example is given as follows:

Diphosphorus pentasulfide (32 g) is added to a solution of 40 g of 5-o-chlorophenyl-7-ethyl-1,2-dihydro-3H-thieno[2,3-e][1,4]diazepin-2-one in 20 ml of pyridine, and the resulting mixture is stirred at 60°C for 1 hour, and then allowed to cool. Then the reaction mixture is poured into 2 liters of ice water under cooling, and the precipitate is collected by suction filtration, washed well with water and dissolved in chloroform. The chloroform solution is washed with an aqueous sodium hydrogen carbonate solution and then with water, dried over sodium sulfate, and then concentrated under reduced pressure. The residue is recrystallized from a mixture of ethanol and chloroform to give 31.4 g of 5-o-chlorophenyl-7-ethyl-1,2-dihydro-3H-thieno[2,3-e][1,4]diazepine-2-thione as yellow crystals, melting at 198°–199°C with decomposition.

The following compounds are prepared in an analogous manner:

5-Phenyl-7-ethyl-1,2-dihydro-3H-thieno[2,3-e][1,4]diazepine-2-thione, melting at 202°–203°C with decomposition;

5-o-Fluorophenyl-7-ethyl-1,2-dihydro-3H-thieno[2,3-e][1,4]diazepine-2-thione, melting at 188°–189°C with decomposition;

5-o-Tolyl-7-ethyl-1,2-dihydro-3H-thieno[2,3-e][1,4]diazepine-2-thione, melting at 223°–225°C with decomposition;

5-o-Methoxyphenyl-7-ethyl-1,2-dihydro-3H-thieno[2,3-e][1,4]diazepine-2-thione, melting at 189°–190°C with decomposition;

5-o-Chlorophenyl-7-methyl-1,2-dihydro-3H-thieno[2,3-e][1,4]diazepine-2-thione, melting at 218°–219°C with decomposition;

5-o-Bromophenyl-7-ethyl-1,2-dihydro-3H-thieno[2,3-e][1,4]diazepine-2-thione, melting at 194°–195°C;

5-Phenyl-6,7-dimethyl-1,2-dihydro-3H-thieno[2,3-e][1,4]diazepine-2-thione, melting at 232°–233°C with decomposition;

5-o-Chlorophenyl-6,7-dimethyl-1,2-dihydro-3H-thieno[2,3-e][1,4]diazepine-2-thione, melting at 220°–221°C;

5-o-Chlorophenyl-1,2,6,7,8,9-hexahydro-3H-[1]benzothieno[2,3-e][1,4]diazepine-2-thione, melting at 235°C with decomposition;

5-Phenyl-1,2,6,7,8,9-hexahydro-3H-[1]benzothieno[2,3-e][1,4]diazepine-2-thione, melting at 250°–251°C;

5-(2-Pyridyl)-7-ethyl-1,2-dihydro-3H-thieno[2,3-e][1,4]diazepine-2-thione, melting at 199°–200°C with decomposition; and 5-(3-Pyridyl)-7-ethyl-1,2-dihydro-3H-thieno[2,3-e][1,4]diazepine-2-thione, melting at 188°C with decomposition.

Again tautomerism is encountered here in the compound of formula (VI) wherein X is —SH:

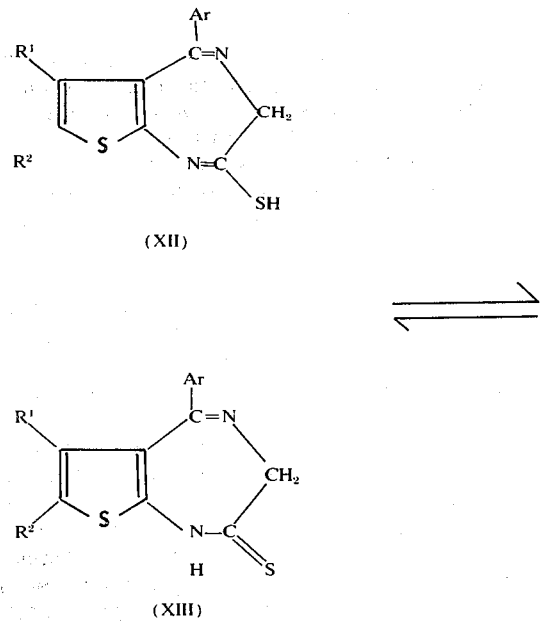

(XII)

(XIII)

wherein Ar, $R^1$ and $R^2$ are as defined above. In this specification, however, these compounds are named as thione compounds of formula (XIII).

METHOD C.

This method can be used to prepare compounds of formula (VI) wherein X is —S—$CH_3$. In this method, a thione compound of formula (XIII) prepared by the above method (b), is firstly converted into an alkali metal salt by treating it with an alkali metalating agent such as sodium methoxide or sodium amide, in a solvent, and then the resulting alkali metal salt, without separation, is allowed to react with a methylating agent such as methyl iodide. A specific example is given as follows:

1.7 g of sodium methoxide is added to a solution of 10 g of 5-o-chlorophenyl-7-ethyl-1,2-dihydro-3H-thieno[2,3-e][1,4]diazepine-2-thione in 50 ml of dimethylformamide, and the resulting mixture is stirred at room temperature for 40 minutes. Then 4.8 g of methyl iodide is added dropwise to this mixture, and the whole mixture is stirred at room temperature for 2 hours. After cooling, the reaction mixture is poured into 300 ml of ice water, the aqueous mixture is extracted with ethyl acetate, the extract is washed well with water and dried over sodium sulfate, and the solvent is distilled off under reduced pressure. Thus is obtained 8.6 g of crude 2-methylthio-5-o-chlorophenyl-7-ethyl-3H-thieno[2,3-e][1,4]diazepine as a viscous oil. This product can be purified by silica gel column chromatography using benzene as an eluent. The pure product is also a viscous oil.

The compounds of formula (I) can be converted into the corresponding acid addition salts in a conventional manner by treating the compounds with various inorganic and organic acids, for example, hydrochloric, hydrobromic, sulfuric, oxalic, maleic and fumaric acids.

The compounds of formula (I) and pharmaceutically acceptable acid addition salts thereof are excellent in narcosis potentiation, suppression of fighting behavior and anticonvulsant effect as shown, for example, by the following tests on the most preferred compound, 1-methyl-6-o-chlorophenyl-8-ethyl-4H-s-triazolo[3,4-c]thieno[2,3-e][1,4]diazepine:

I. NARCOSIS POTENTIATION

The influence of the 30 minutes pre-treatment with the test compound on the action of 40 mg/kg (sub-narcotic dose) of hexobarbital was investigated by using groups each of 6 male mice. The effect of narcosis potentiation by the test compound was determined by the disappearance of righting reflex lasting above 30 seconds. Righting reflex was examined 15 and 30 minutes after the administration of hexobarbital. When no reflex was observed within the above time, the percentage of narcosis potentiation was evaluated as 100%, and $PD_{50}$ (a dose required for 50% potentiation) of the test compound was found graphically to be 0.8 mg/kg.

II. SUPPRESSION OF FIGHTING BEHAVIOR

Fighting episodes were produced in mice by the method described by Tedeschi et al. in Journal of Pharmacology and Experimental Therapeutics, Vol. 125, pp. 28 ff. (1959). Groups of 8 female mice (4 pairs) were given orally the test compound 60 minutes prior to receiving electric foot-shock for 3 minutes with 530 volts interrupted direct current, 1.3 milliamperes, 10 Hz. Exhibiting 3 fighting episodes or less within 3 minutes was deemed to be an effective suppression by the test compound. The control mice of 81 pairs had shown the fighting episodes of 8.7 times on the average under the same conditions. The $ED_{50}$, a dose required to suppress 50% of fighting pairs, was found graphically to be 0.4 mg/kg.

III. ANTICONVULSANT EFFECT

Pentylenetetrazol (150 mg/kg) was administered subcutaneously to groups each of 6 mice 15 minutes after the intraperitoneal administration of the test compound. The number of dead mice was counted within 3 hours after the administration of pentylenetetrazol, and then the $ED_{50}$, a dose required to reduce the number of dead mice to 50%, was found graphically to be 0.12 mg/kg.

In view of various tests, including those mentioned above, the compounds of the invention represented by formula (I) and pharmaceutically acceptable acid addition salts thereof can be safely administered orally as minor tranquillizers (antianxiety drugs) for the treatment of neurosis, anxiety, tension and depressive states, in the form of a pharmaceutical preparation with a suitable and conventional pharmaceutically acceptable carrier or adjuvant, without adversely affecting the patients.

The pharmaceutical preparations can take any conventional form such as tablets, capsules or powders.

FORMULATION EXAMPLES a. Tablets each containing 1 mg of an active ingredient are prepared from the following compositions:

| | |
|---|---|
| Compound (I) | 1 mg |
| Lactose | 30 |
| Microcrystalline Cellulose | 53 |
| Corn Starch | 17 |
| Talc | 9 |
| | 110 mg | b. A 1% powder is prepared from the following compositions:

| | |
|---|---|
| Compound (I) | 1% by weight |
| Lactose | 97 |
| Methyl Cellulose | 1 |
| Silicon Dioxide | 1 |
| | 100% |

The daily dose of compound (I) or a salt thereof for human adults usually ranges from about 2 to 24 mg, in single or multiple dose, but it may vary depending upon the age, body weight, and/or severity of the conditions to be treated as well as the response to the medication.

The present invention will be better understood from the following examples, but they are not to be construed as limiting the present invention.

EXAMPLE 1

6-o-Chlorophenyl-8-ethyl-4H-s-triazolo[3,4-c]thieno[2,3-e][1,4]diazepine a. A suspension of 3.2 g of 2-hydrazino-5-o-chlorophenyl-7-ethyl-3H-thieno[2,3-e][1,4]diazepine in 20 ml of ethyl orthoformate is stirred at 80°C. About 30 minutes later the reaction mixture turns into a orange-yellow, transparent solution. The stirring is continued at the same temperature for an additional 30 minutes. Then the ethanol formed and the excess ethyl orthoformate are distilled off under reduced pressure. The residue is crystallized by adding a mixture of ligroin and ethyl acetate. The thus precipitated crystals are collected by suction filtration and recrystallized from toluene to give 2.7 g of the title compound as colorless needles, melting at 153°–154°C.

b. A mixture of 3.2 g of 2-hydrazino-5-o-chlorophenyl-7-ethyl-3H-thieno[2,3-e][1,4]diazepine and 2.5 g of formimino ethyl ether hydrochloride in 100 ml of chloroform is stirred at room temperature for 12 hours and then refluxed moderately for 30 minutes. After cooling, the chloroform phase is washed with an aqueous saturated sodium hydrogen carbonate solution, dried over sodium sulfate and then concentrated under reduced pressure. The residue is crystallized by adding a small amount of ethyl acetate. The thus precipitated crystals are collected by filtration and recrystallized from a mixture of ligroin and ethanol to give 2.1 g of the title compound as colorless needles, melting at 153°–154°C.

c. A mixture of 3 g of 2-hydrazino-5-o-chlorophenyl-7-ethyl-3H-thieno[2,3-e][1,4]diazepine, 2.5 g of formamidine hydrochloride and 3 g of 2-methylimidazole is heated at 160°C for 10 minutes. Then water is added to the reaction mixture, the aqueous mixture is extracted with chloroform, the extract is dried over sodium sulfate, and the solvent is distilled off under reduced pressure. The thus obtained crude crystalline product is recrystallized from a mixture of ligroin and ethanol to give 2.4 g of the title compound as colorless needles, melting at 153°–154°C.

d. A mixture of 3.2 g of 2-hydrazino-5-o-chlorophenyl-7-ethyl-3H-thieno[2,3-e][1,4]diazepine and 20 ml of formic acid is allowed to stand overnight. Then the reaction mixture is poured into 300 ml of ice water, the aqueous mixture is neutralized with sodium hydrogen carbonate and extracted with ethyl acetate. The extract is washed with an aqueous sodium chloride solution, dried over sodium sulfate and concentrated under reduced pressure. The residue is recrystallized from a mixture of ligroin and ethanol to give 2.1 g of the title compound as colorless needles, melting at 153°–154°C.

e. To a suspension of 6.1 g of 2-amino-5-o-chlorophenyl-7-ethyl-3H-thieno[2,3-e][1,4]diazepine in 150 ml of methanol are added 2.4 g of 2-methylimidazole and 25 ml of a methanol solution containing 1 ml of hydrazine hydrate. The resulting mixture is stirred at room temperature for 2 hours. To this mixture are then added 4.5 g of ethyl orthoformate and 2 drops of concentrated sulfuric acid, and the whole mixture is stirred under reflux for 1 hour. After cooling, the solvent is distilled off under reduced pressure, an aqueous saturated sodium hydrogen carbonate solution is added to the residue, and the aqueous mixture is extracted with ethyl acetate. The extract is washed with water, dried over sodium sulfate, and then concentrated under reduced pressure. The residue is recrystallized from a mixture of ligroin and ethanol to give the title compound as colorless needles, melting at 153°–154°C.

EXAMPLE 2

1-Methyl-6-o-chlorophenyl-8-ethyl-4H-s-triazolo[3,4-c]thieno[2,3-e][1,4]diazepine a. To a suspension of 6.4 g of 2-hydrazino-5-o-chlorophenyl-7-ethyl-3H-thieno[2,3-e][1,4]diazepine in 100 ml of ethanol are added 16 g of ethyl orthoacetate and 1 ml of concentrated sulfuric acid, and the whole mixture is stirred under reflux for 1 hour. After cooling, the solvent is distilled off under reduced pressure, an aqueous sodium carbonate solution is added to the residue, and the aqueous mixture is extracted with ethyl acetate. The extract is dried over anhydrous potassium carbonate, concentrated under reduced pressure, and the oily residue is crystallized from a mixture of ligroin and acetone. The thus precipitated crystals are collected by suction filtration and recrystallized from a mixture of ligroin and acetone to give 6.1 g of the title compound as colorless crystalline powder, melting at 147°–148°C.

b. A mixture of 3.2 g of 2-hydrazino-5-o-chlorophenyl-7-ethyl-3H-thieno[2,3-e][1,4]diazepine and 2.5 g of acetimino ethyl ether hydrochloride in 100 ml of chloroform is stirred at room temperature and then refluxed moderately for 30 minutes. After cooling, the chloroform phase is washed with an aqueous saturated sodium hydrogen carbonate solution and then with water, dried over sodium sulfate, and concentrated under reduced pressure. To the residue are added 20 ml of acetone and 2 ml of 30% ethanolic hydrochloric acid, the resulting homogeneous solution is treated with decolorizing charcoal, and then the solvent is distilled off under reduced pressure. The residue is recrystallized from a mixture of acetone and ethanol to give 2.8 g of the corresponding dihydrochloride of the title compound as colorless, strongly hygroscopic granules. This product begins to foam at 175°C and decomposes at 194°–196°C.

c. A mixture of 3 g of 2-hydrazino-5-o-chlorophenyl-7-ethyl-3H-thieno[2,3-e][1,4]diazepine, 3 g of acetamidine hydrochloride and 3 g of 2-methylimidazole is heated at 160°C for 10 minutes. Then water is added to the reaction mixture, the aqueous mixture is extracted with chloroform, the extract is dried over sodium sulfate, and the solvent is distilled off under reduced pressure. The thus precipitated crude crystalline product is recrystallized from a mixture of ligroin and acetone to give 2.1 g of the title compound as colorless crystalline powder, melting at 147°–148°C.

d. To a suspension of 3 g of 2-hydrazino-5-o-chlorophenyl-7-ethyl-3H-thieno[2,3-e][1,4]diazepine in 100 ml of chloroform are added 3 g of acetamidine hydrochloride and 2.8 g of 2-methylimidazole, and the resulting mixture is stirred at room temperature for 20 hours. Then water is added to the reaction mixture, the chloroform phase is dried over sodium sulfate, and the solvent is distilled off under reduced pressure. The thus obtained crude crystalline product is recrystallized from acetone to give 2.0 g of 2-(1-aminoethylidene)hydrazine-5-o-chlorophenyl-7-ethyl-3H-thieno[2,3-e][1,4]diazepine as pale yellow crystals, melting at 199°–200°C with decomposition. This product (2.0 g) is heated at 195°C for 10 minutes. Then water is added, the aqueous mixture is extracted with chloroform, the extract is dried over sodium sulfate, and then the solvent is distilled off under reduced pressure. The thus obtained crude crystalline product is recrystallized from a mixture of ligroin and acetone to give 1.2 g of the title compound as colorless crystalline powder, melting at 147°–148°C.

e. A mixture of 3 g of 2-hydrazino-5-o-chlorophenyl-7-ethyl-3H-thieno[2,3-e][1,4]diazepine, 50 g of thioacetamide and 1 ml of concentrated sulfuric acid is heated at 190°C for 10 hours. Then water is added to the reaction mixture, the aqueous mixture is made alkaline with sodium hydrogen carbonate and extracted with chloroform. The extract is dried over sodium sulfate, and the solvent is distilled off under reduced pressure. To the residue are added 20 ml of acetone and 2 ml of 30% hydrochloric acid, the resulting solution is treated with decolorizing charcoal, and then the solvent is distilled off under reduced pressure. The residue is recrystallized from a mixture of acetone and ethanol to give 2.4 g of the corresponding dihydrochloride of the title compound as colorless granules. This product begins to foam at 175°C and decomposes at 194°–196°C.

f. A solution of 3.2 g of 2-hydrazino-5-o-chlorophenyl-7-ethyl-3H-thieno[2,3-e][1,4]diazepine and 1 ml of acetic anhydride in 100 ml of chloroform is stirred at room temperature for 1 hour. Then the chloroform phase is neutralized with an aqueous sodium hydrogen carbonate solution, washed with water, dried over sodium sulfate, and then concentrated under reduced pressure. The residue is crystallized from toluene, and the crude product is recrystallized from ethanol to give 3.5 g of 2-acetylhydrazino-5-o-chlorophenyl-7-ethyl-3H-thieno[2,3-e][1,4]diazepine as pale yellow crystals, melting at 200°–201°C with decomposition. This product (3.0 g) is heated for 20 minutes on a bath maintained at 205°C while mild suction is applied with an aspirator. After cooling, ethyl acetate is added, the resulting solution is treated with decolorizing charcoal, and the solvent is distilled off under reduced pressure. The residue is crystallized from a mixture of ligroin and acetone, and the crude product is recrystallized from a mixture of ligroin and acetone to give 1.8 g of the title compound as colorless crystalline powder, melting at 147°–148°C.

The intermediate, 2-acetylhydrazino-5-o-chlorophenyl-7-ethyl-3H-thieno[2,3-e][1,4]diazepine can also be prepared by the following method:

Acetohydrazide (1.0 g) is added to a solution of 3.2 g of 5-o-chlorophenyl-7-ethyl-1,2-dihydro-3H-thieno[2,3-e][1,4]diazepine-2-thione in 80 ml of chloroform, and the resulting solution is stirred at room temperature for 4 hours and then refluxed for 2 hours. Then the chloroform is distilled off under reduced pressure. The residue is crystallized from ethanol, and the crude product is recrystallized from a mixture of toluene and chloroform to give 3.1 g of 2-acetylhydrazino-5-o-chlorophenyl-7-ethyl-3H-thieno[2,3-e][1,4]diazepine, melting at 200°–201°C with decomposition.

g. 10 ml of a chloroform solution containing 0.8 g of acetyl chloride is added dropwise to a solution of 3.2 g of 2-hydrazino-5-o-chlorophenyl-7-ethyl-3H-thieno[2,3-e][1,4]diazepine and 1 ml of triethylamine in 60 ml of chloroform, and the resulting solution is stirred at room temperature for 3 hours. Then the chloroform phase is washed in sequence with water, an aqueous saturated sodium hydrogen carbonate solution and water, dried over sodium sulfate, and concentrated under reduced pressure. The residue is crystallized from toluene and the crystals are collected by suction filtration to give 3.4 g of 2-acetylhydrazino-5-o-chlorophenyl-7-ethyl-3H-thieno[2,3-e][1,4]diazepine, melting at 200°–201°C with decomposition. A mixture of this product (3.4 g) and 25 g of polyphosphoric acid is stirred at 150°C for 2 hours. Then the reaction mixture is poured into 300 ml of ice water, and the aqueous mixture is neutralized with concentrated aqueous ammonia. The separated oil is extracted with ethyl acetate, the extract is washed well with water, dried over sodium sulfate and concentrated under reduced pressure. The residue is crystallized from a mixture of ligroin and acetone, and the crude product is recrystallized from a mixture of ligroin and acetone to give the title compound as colorless crystalline powder, melting at 147°–148°C.

EXAMPLE 3

1-Methyl-6-phenyl-8-ethyl-4H-s-triazolo[3,4-c]thieno[2,3-e][1,4]diazepine

A mixture of 2.8 g of 2-hydrazino-5-phenyl-7-ethyl-3H-thieno[2,3-e][1,4]diazepine, 50 g of acetamide and 1 ml of concentrated sulfuric acid is stirred at 190°C for 15 minutes. Then water is added to the reaction mixture, the aqueous mixture is neutralized with sodium hydrogen carbonate and extracted with chloroform. The extract is dried over sodium sulfate, and concentrated under reduced pressure. The residue is purified by silica gel column chromatography using a mixture of chloroform and methanol (100:1) as an eluent. The fractions containing the objective compound are concentrated under reduced pressure, and the thus obtained crude crystalline product is recrystallized from a mixture of chloroform and ligroin to give 0.6 g of the title compound as colorless crystals, melting at 166°–167°C.

EXAMPLE 4

6-Phenyl-8-ethyl-4H-s-triazolo[3,4-c]thieno[2,3-e][1,4]diazepine 1.5 ml of hydrazine hydrate is added to a solution of 5.7 g of 5-phenyl-7-ethyl-1,2-dihydro-3H-thieno[2,3-e][1,4]diazepine-2-thione in a mixture of 50 ml of methanol and 50 ml of tetrahydrofuran, and the resulting mixture is stirred at room temperature for 2 hours. To this solution are then added 14.8 g of ethyl orthoformate and 2 drops of concentrated sulfuric acid, and the whole mixture is stirred under reflux for 1 hour. After cooling, the reaction mixture is concentrated under reduced pressure, an aqueous saturated sodium hydrogen carbonate solution is added to the residue, and the aqueous mixture is extracted with ethyl acetate. The extract is washed with water, dried over sodium sulfate, and concentrated under reduced pressure. The residue is crystallized from ligroin to give the title compound as colorless crystals, which melts at 153°–154°C after recrystallization from a mixture of chloroform and ligroin.

Using the procedure set forth in the above examples, but substituting equivalent amounts of the appropriate starting compounds, the following compounds are also produced:

1. 6-(2-Pyridyl)-8-ethyl-4H-s-triazolo[3,4-c]thieno[2,3-e][1,4]diazepine, melting at 165°–166°C;
2. 6-(3-Pyridyl)-8-ethyl-4H-s-triazolo[3,4-c]thieno[2,3-e][1,4]diazepine, melting at 166°–167°C;
3. 1-Methyl-6-(3-pyridyl)-8-ethyl-4H-s-triazolo[3,4-c]thieno[2,3-e][1,4]diazepine, melting at 196°–197°C;
4. 6-o-Chlorophenyl-7,8,9,10-tetrahydro-4H-s-triazolo[3,4-c][1]benzothieno[2,3-e][1,4]diazepine, melting at 214°–215°C with decomposition;
5. 1-Methyl-6-o-chlorophenyl-7,8,9,10-tetrahydro-4H-s-triazolo[3,4-c][1]benzothieno[2,3-e][1,4]diazepine containing 0.5 molecule of ethanol of crystallization, becoming damp gradually at from 85°C and melting at 120°–124°C with decomposition;
6. 6-Phenyl-7,8,9,10-tetrahydro-4H-s-triazolo[3,4-c][1]benzothieno[2,3-e][1,4]diazepine, melting at 222°–223°C;
7. 6-o-Chlorophenyl-8-methyl-4H-s-triazolo[3,4-c]thieno[2,3-e][1,4]diazepine, melting at 193°–194°C;
8. 6-Phenyl-7,8-dimethyl-4H-s-triazolo[3,4-c]thieno[2,3-e][1,4]diazepine, melting at 195°–196°C;
9. 1,7,8-Trimethyl-6-o-chlorophenyl-4H-s-triazolo[3,4-c]thieno[2,3-e][1,4]diazepine, melting at 197°–198°C;
10. 1,8-Diethyl-6-o-chlorophenyl-4H-s-triazolo[3,4-c]thieno[2,3-e][1,4]diazepine dihydrochloride, melting at 143°–145°C with decomposition;
11. 1-Phenyl-6-o-chlorophenyl-8-ethyl-4H-s-triazolo[3,4-c]thieno[2,3-e][1,4]diazepine, melting at 139°–141°C;
12. 6-o-Tolyl-8-ethyl-4H-s-triazolo[3,4-c]thieno[2,3-e][1,4]diazepine, melting at 128°–130°C;
13. 6-o-Fluorophenyl-8-ethyl-4H-s-triazolo[3,4-c]thieno[2,3-e][1,4]diazepine, melting at 156°–157°C;
14. 1-Methyl-6-o-fluorophenyl-8-ethyl-4H-s-triazolo[3,4-c]thieno[2,3-e][1,4]diazepine, melting at 195°–196°C;
15. 6-o-Bromophenyl-8-ethyl-4H-s-triazolo[3,4-c]thieno[2,3-e][1,4]diazepine, melting at 158°–159°C; and
16. 1-Methyl-6-o-bromophenyl-8-ethyl-4H-s-triazolo[3,4-c]thieno[2,3-e][1,4]diazepine, melting at 142°–143°C.

Although the present invention has been adequately discussed in the foregoing specification and examples included therein, one readily recognizes that various changes and modifications may be made without departing from the spirit and scope thereof.

What is claimed is:
1. The compound:
   6-o-chlorophenyl-8-ethyl-4H-s-triazolo[3,4-c]thieno[2,3-e][1,4]diazepine.
2. The compound:
   1-Methyl-6-o-chlorophenyl-8-ethyl-4H-s-triazolo[3,4-c]thieno[2,3-e][1,4]diazepine.
3. The compound: 6-o-Chlorophenyl-8-methyl-4H-s-triazolo[3,4-c]thieno[2,3-e][1,4]diazepine.
4. The compound: 1,8-Diethyl-6-o-chlorophenyl-4H-s-triazolo[3,4-c]thieno[2,3-e][1,4]diazepine.
5. The compound: 6-o-Fluorophenyl-8-ethyl-4H-s-triazolo[3,4-c]thieno[2,3-e][1,4]diazepine.
6. The compound: 1-Methyl-6-o-Fluorophenyl-8-ethyl-4H-s-triazolo[3,4-c]thieno[2,3-e][1,4]diazepine.
7. The compound: 6-o-Bromophenyl-8-ethyl-4H-s-triazolo[3,4-c]thieno[2,3-e][1,4]diazepine.
8. The compound: 1-Methyl-6-o-bromophenyl-8-ethyl-4H-s-triazolo[3,4-c]thieno[2,3-e][1,4]diazepine.

* * * * *